United States Patent [19]

Hart et al.

[11] Patent Number: 4,807,233
[45] Date of Patent: Feb. 21, 1989

[54] PHASE LOCKED CUSP-SHAPED DIELECTRIC RIDGE GAS LASER

[75] Inventors: Richard A. Hart, Wethersfield; Leon A. Newman, South Windsor; John T. Kennedy, Meriden, all of Conn.

[73] Assignee: United Technologies Corporation, Hartford, Conn.

[21] Appl. No.: 138,899

[22] Filed: Dec. 28, 1987

[51] Int. Cl.[4] .............................................. H01S 3/098
[52] U.S. Cl. ...................................... 372/18; 372/64; 372/82
[58] Field of Search ...................... 372/18, 55, 64, 82, 372/92

[56] References Cited

U.S. PATENT DOCUMENTS

| 4,363,126 | 12/1982 | Chenausky et al. | 372/38 |
| 4,443,877 | 4/1984 | Chenausky et al. | 372/38 |
| 4,577,323 | 3/1986 | Newman et al. | 372/82 |
| 4,688,228 | 8/1987 | Newman et al. | 372/18 |

OTHER PUBLICATIONS

L. A. Newman et al.; "High Power Coupled $CO_2$ Waveguide Laser Array"; Appl. Phys. Lett. 48(25), 23 Jun. 1986; pp. 1701–1703.

Primary Examiner—William L. Sikes
Assistant Examiner—B. Randolph
Attorney, Agent, or Firm—Peter R. Ruzek

[57] ABSTRACT

A phase-locked ridge waveguide gas laser includes a body that circumferentially bounds an internal space extending along a central plane and containing a gaseous lasing medium. The gaseous medium is excited at radio frequency with attendant light emission from the gaseous medium. Mirrors are so positioned relative to the body as to provide lasing of the light emission. Respective ridges partition the internal space into a plurality of cylindrical laser resonator cavities each sustaining a guided mode of the lasing light emission. Each of the cavities extends longitudinally of the body and is spaced from an adjacent cavity by a predetermined distance in a width direction of the internal space. The ridges are substantially cusp-shaped and extend into the internal space along a height dimension in respective aligned pairs. At least one of the ridges of each pair terminates short of the central plane to provide with the respective other ridge of the pair a gap which connects two adjacent ones of the laser resonator cavities for phase-locking the guided modes in such cavities. The adjacent resonator cavities overlap each other at the region of the respective gaps.

7 Claims, 5 Drawing Sheets

PHASE LOCKED CUSP-SHAPED DIELECTRIC RIDGE GAS LASER

The Government has rights in this invention pursuant to a contract awarded by the Department of the Air Force.

DESCRIPTION

1. Technical Field

This invention relates to waveguide lasers and more particularly to $CO_2$ waveguide lasers having an array of phase locked resonators separated from each other by respective ridges.

2. Background Art

The advent of the waveguide gas laser allows the fabrication of more compact lasers. Reducing the dimensions of the passage of the discharge housing provides increased gain, higher power generated per unit volume and improved saturation parameter. This increase in power is achieved even though linear gas waveguides leak radiation into the walls of the dielectric, because of the existence of well defined, low loss modes of laser propagation. The performance enhancements result from favorable de-excitation of the gas by wall collisions, from device operation at increased gas pressure, and from reduction in gas temperature due to the improved thermal conduction provided by the waveguide walls.

In an effort to further increase output power, several improvements have been developed. One device presented by H. R. Schlossberg in U.S. Pat. No. 4,367,554 of Jan. 4, 1983 has increased output power by employing a plurality of hollow dielectric channels within a chamber containing a $CO_2$ gas mixture. The diameter of the individual dielectric channels must be selected such that each channel is incapable of sustaining a guided mode of propagation, and be fabricated with an optically leaky dielectric. Only the multiplicity of leaky channels in combination provides sufficient gain for lasing within a device that comprises the totality of channels.

Another technique which has been used to increase the output power of gas lasers is to provide a mechanism for phase locking one laser relative to another, either by injection locking or by optical coupling techniques. Phase locking maintains spatial coherence between the individual resonators.

Injection locking of adjacent lasers is accomplished by feeding the output of a single laser into a parallel array of optical resonators which act as amplifiers. When the lengths of the different optical paths are adjusted properly, the phase of the output of the amplifiers is constant. Although this technique provides phase locking and increased power, it mandates the use of external optical assemblies, such as mirrors and mounts, all of which must be precisely adjusted and which are subject to environmental degradation.

Another effective technique for providing phase locking is through optical coupling of adjacent lasers. Phase locked operation of adjacent lasers by optical coupling has been demonstrated in both waveguide gas lasers and semiconductor lasers. However, the physics which determine the operation of semiconductor lasers differ substantially from those applicable to waveguide gas lasers. A semiconductor laser is characterized by a guiding region whose index of refraction is greater than that of the surrounding cladding material. On the other hand, a waveguide gas laser possesses a guiding region having an index of refraction much lower than that of the surrounding material.

Optical coupling in the two types of lasers occurs from two entirely different mechanisms. Semiconductor lasers couple as a result of the existence of an evanescent portion of the guided optical field in one resonator that penetrates into another closely proximate resonator. Optical coupling between adjacent waveguide gas lasers cannot be by evanescent field coupling, but can only result from optical radiation loss or "leaks" between adjacent lasers. Consequently, techniques used to optically couple semiconductor lasers have only limited, if any, applicability to waveguide gas lasers.

One type of an optically coupled waveguide gas laser of the prior art comprises an elongated chamber that is divided into a plurality of longitudinal waveguides by partitions made from an optically transmitting dielectric material. Prior art lasers of this type are excited by conventional DC or RF discharge that is provided to each optical resonator. The optically transmissive dielectric provides a lossy boundary through which energy leaks from one resonating cavity to the next, effectively coupling the phases and changing the amplitude distribution of the waveguide modes.

Coupled waveguide gas lasers of this kind provide for increased power and phase locking. However, these devices are expensive to fabricate because of the dielectric array contained within the chamber. In addition, the amount of energy which "leaks" from one cavity to the next is limited to relatively small levels because of the high reflectivity of the transmitting material at the oblique angles of incidence which characterize mode propagation in waveguides. This in turn limits the operating parameters under which stable phase locked operation can be achieved.

Optically transmitting dielectric materials absorb power to some extent and reduce the overall amount of power available to the laser. It is well known in the art that employing a lossy dielectric separation between resonators will favor the "antisymmetric" phase locked normal mode of operation. This mode of operation is undesirable for most applications because the laser output beam possesses a power null across the optic axis. Moreover, the compartmentalized design of these lasers burdens them with poor thermal conductivity and undesirable gas flow characteristics. It is difficult to obtain optically transmitting materials in the infrared that are also good heat conductors for carrying away the heat generated by the electrical power dissipated in the laser's plasma column.

Initiating and sustaining a discharge in the resonator regions is difficult. With either DC or RF excitation, the resonator ridge geometry produces a higher electric field strength within the gap above the ridges than in the resonators. Consequently, coupled ridge waveguide gas lasers of the prior art prevent gas breakdown in the gap and limit the discharge to the resonator regions. The additional apparatus needed to confine the discharge entails using additional components resulting in higher costs.

In quest for increasing the output power of a waveguide gas laser arrangement, it has been proposed in a copending commonly assigned U.S. Pat. No. 4,688,228, issued Aug. 18, 1987, to arrange a plurality of resonator cavities next to one another, and to separate each adjacent two of such cavities from each other only incompletely by a ridge which extends from one of the major internal surfaces bounding the cross-sectionally rectangular internal space of the laser body toward the other major surface, but which terminates short of such other major surface.

Experience has shown that this waveguide gas laser arrangement operated well with two of such resonator cavities. However, when the number of the resonator cavities that are arranged next to one another was increased to three or more with all of the ridges still extending from one and the same major surface, problems were encountered with the quality of the combined laser beam emerging from the laser arrangement and particularly with phase locking between and among the resonator cavities. Such problems are attributable to the fact that a large open or unguided region exists at one of the major surfaces bounding the internal space subdivided by the ridges into individual resonator cavities. This open region not only permits radiation to leak from one of the resonator cavities to the adjacent one to achieve the desirable phase locking, but also permits the development of higher-order transverse modes. Consequently, a great number of transverse mode beats was observed in laser arrangements having several adjacent resonator cavities connected with one another by such a large open region.

Moreover, the gain and mode of the previously proposed gas laser arrangements provided with cross-sectionally rectangular or U-shaped channels forming the resonator cavities are not well matched to one another. This means that such channels include corners where the gaseous lasing medium is being pumped and, consequently, exhibits gain. This has two disadvantageous results. First, the power dissipated in the corners so such cross-sectionally rectangular or U-shaped channels is wasted, resulting in a diminished efficiency of the gas laser arrangement. Secondly, gain within the corner regions can support modes other than the desired $EH_{11}$ mode, resulting in mode beating in the outgoing laser beam and in further reduction in the useful power of such output laser beam.

Accordingly, it is a general object of the present invention to avoid the disadvantages of the prior art.

More particularly, it is an object of the present invention to provide a waveguide gas laser arrangement which does not possess the disadvantages of the known arrangements of this type.

Still another object of the present invention is so to construct the arrangement of the type here under consideration as to provide phase coupling between and among the adjacent resonator cavities.

A concomitant object of the present invention is to develop the above arrangement in such a manner as to adequately discriminate against higher-order transverse modes and to keep the power of such higher modes to a minimum, if not eliminate such higher order modes altogether.

It is yet another object of the present invention to design the above arrangement as to be relatively simple in construction, inexpensive to manufacture, easy to use, and reliable in operation nevertheless.

DISCLOSURE OF THE INVENTION

The above objects and others which will become apparent hereafter are achieved by a phase-locked ridge waveguide gas laser which includes a body circumferentially bounding an internal space extending along a central plane and containing a gaseous lasing medium. The gaseous medium is excited at radio frequency with attendant light emission from the gaseous medium. Mirrors are so positioned relative to the body as to provide lasing of the light emission. Respective ridges partition the internal space into a plurality of cylindrical laser resonator cavities each sustaining a guided mode of the lasing light emission. Each of the cavities extends longitudinally of the body and is spaced from an adjacent cavity by a predetermined distance in a width direction of the internal space. The ridges are substantially cusp-shaped and extend into the internal space along a height dimension in respective aligned pairs. At least one of the ridges of each pair terminates short of the central plane to provide with the respective other ridge of the pair a gap which connects two adjacent ones of the laser resonator cavities for phase-locking the guided modes in such cavities.

Advantageously, each of the ridges is delimited by two concave surfaces terminating at the respective gap. It is especially advantageous when the concave surfaces delimiting at least one but preferably both of the ridges of each pair form a relatively sharp edge at the respective gap. The predetermined distance between the resonator cavities is advantageously such that the adjacent resonator cavities, which are bounded by respective corresponding concave surfaces delimiting the respective ridge pair and by curved imaginary surfaces constituting smooth continuations of and connections between such corresponding curved surfaces, overlap each other to a small extent, such as substantially between 0.01 and 0.04 millimeters, at the respective gap. Each of the resonator cavities is advantageously substantially circular in cross section.

BEST MODE FOR CARRYING OUT THE INVENTION

Figure 1:
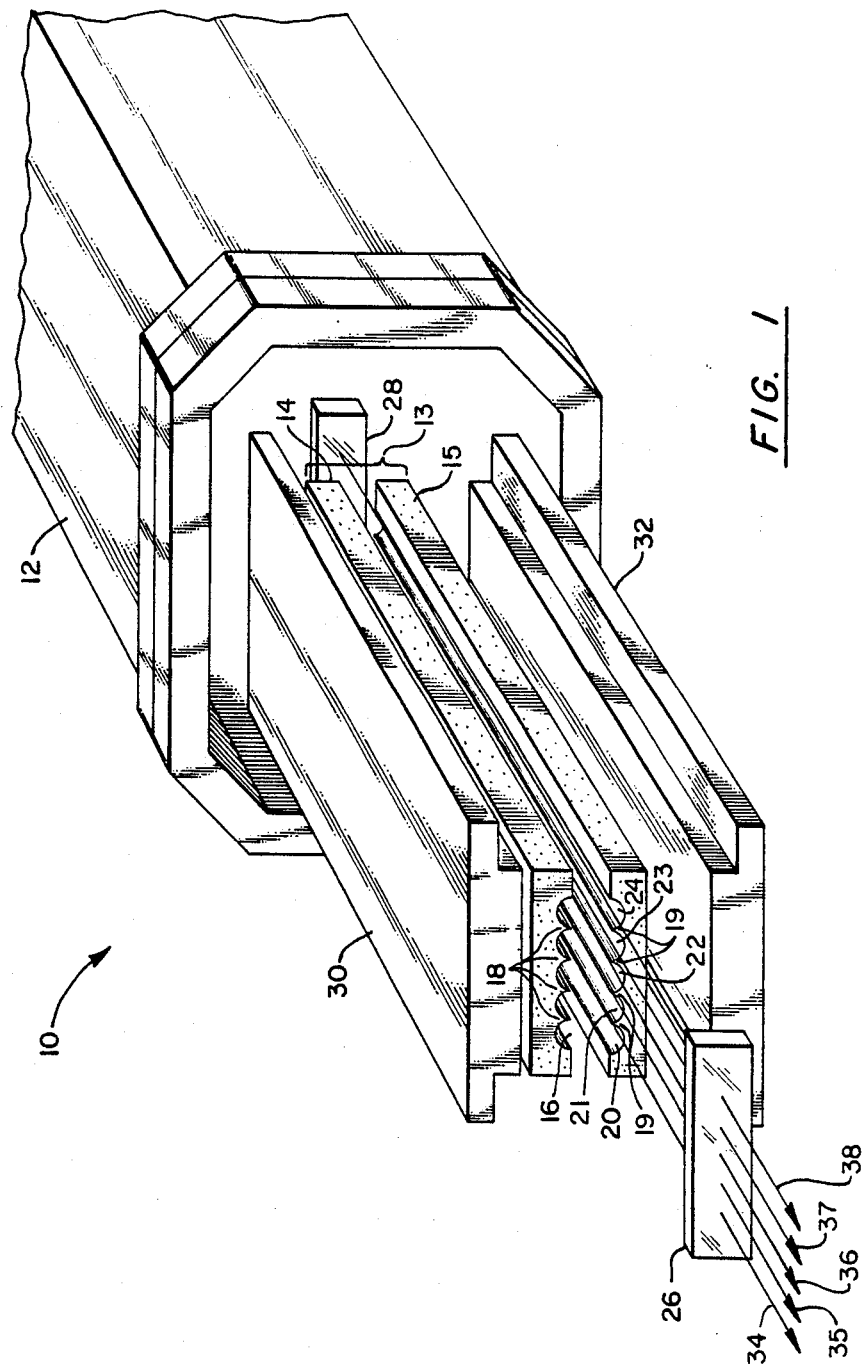
FIG. 1 is an exploded perspective illustration of a phase locked cusp-shaped ridge waveguide gas laser provided according to the present invention.

Referring now to FIG. 1, which is an exploded perspective illustration of a phase locked cusp-shaped ridge waveguide gas laser provided according to the present invention, it may be seen that a phase locked cusp-shaped ridge waveguide gas laser 10 comprises a housing 12 made from bakable aluminum or equivalent. The housing 12 contains a dielectric body 13 which consists of two components 14 and 15, and is made from a ceramic material or equivalent. The components 14 and 15 bound an internal space 16 upon assembly of the body 13. The housing 12 also includes end covers and a gas port in the housing (not shown) enabling the device to be evacuated and back filled with a lasing gas that is also not illustrated.

Inside the internal space 16 are longitudinal ridges 18, 19 formed on the components 14 and 15 of the body 13 by conventional techniques. These ridges 18 and 19 are shown to jointly define five optical resonators 20, 21, 22, 23, and 24, as an example. As hereinafter detailed with respect to FIG. 2, the dimensions of the resonators 20 to 24 must be selected to sustain lasing in a selected mode and to provide optical coupling between the resonators 20, 21, 22, 23, and 24. In the best mode embodiment, the length of the resonators 20 to 24 is approximately 37 cm, although other lengths may be substituted. The dielectric material selected to comprise the components 14 and 15 of the body 13 can be a ceramic material of a type known in the art, such as aluminum oxide ($Al_2O_3$) and in the best mode embodiment comprises beryllium oxide (BeO). Those skilled in the art will note that the ridges 18 and 19 may comprise a different dielectric than the remainders of the components 14 and 15 of the ceramic body 13 and may equivalently be fabricated separately from the body 13 and subsequently positioned in the internal space 16 during assembly.

Mirrors 26 and 28 are located by conventional techniques at either end of the body 13 or within the end covers perpendicular to the resonators 20 to 25. They are made from conventional materials known in the art, such as zinc selenide, and are chosen to be reflective of a selected percentage of incident light at a selected wavelength.

The lasing gas is a conventional mixture, and in the best mode embodiment comprises a mixture of 4% xenon, 12% carbon dioxide, 20% nitrogen and 64% helium by mole fraction at a pressure of 100 Torr. Those skilled in the art will note that other equivalent mixtures and pressures may be equivalently substituted.

Also included are radio frequency electrodes 30 and 32 which are of a conventional type and extend over the entire length of the resonators 20 to 24. In the best mode embodiment the electrodes 30 and 32 comprise copper or aluminum sheet at least 20 $\mu$m thick for excitation at 145 MHz. If other excitation frequencies are substituted, the thickness of the electrodes 30 and 32 must be chosen to be greater than the skin depth. The electrodes 30 and 32 are attached by conventional techniques to the body 13.

When assembled, the housing 12 is evacuated and then filled with the lasing gas. Radio frequency excitation is provided to the RF electrodes 30 and 32 via a conventional RF feedthrough in the housing 12 (not shown) and produces an electrical excitation of the gas. As is well known in the art, proper selection of the optical parameters and gas pressures will result in lasing of the device. Guided mode optical signals 34, 35, 36, 37, and 38 will be produced in the respective resonators 20, 21, 22, 23, and 24.

Although conventional radio frequency excitation may be employed, in the best mode embodiment the radio frequency excitation circuit comprises a distributed inductance parallel resonant radio frequency circuit as presented by Peter Chenausky et al in U.S. Pat. Nos. 4,363,126 and 4,443,877 assigned to the assignee hereof and incorporated by reference herein.

The RF field is developed in the capacitor formed by the body 13 and the upper and lower RF electrodes 30 and 32. The circuit initiates and sustains an electric excitation in the resonator region of the housing 12. An external shunt inductance is provided to resonate the capacitance of the excitation structure. Conventional 50 ohm impedance RF power supplies can effectively be matched to the transverse excitation impedance load presented by the laser structure. By operating a few megahertz off of the center resonant frequency, a point is reached where the real component of the impedance equals 50 ohms. The remaining reactive component can then be cancelled with an appropriate series reactance.

A problem develops as the length of the device is scaled and/or the frequency of the RF field is increased. A voltage variation develops along the length of the device because the electrical characteristics of the laser are distributed throughout its length resulting in a nonuniform discharge and reduced output per unit length. For example, at an operating frequency of 145 MHz and a device length of 37 cm, the high dielectric constant parallel electrode geometry will exhibit standing wave phenomena similar to those observed in a lossy transmission line. Analysis has revealed that if a distributed inductance comprising a multiplicity of discrete circuit inductors is used to resonate the laser, the voltage variations are essentially eliminated. In the best mode embodiment the inductors comprise discrete circuit elements (not shown in FIG. 1) connected between the two RF electrodes 30 and 32. The spacing between the inductors should be much less than a quarter of the excitation wavelength to adequately approximate the distributed inductance. In the best mode embodiment the distributed parallel inductance has a magnitude of 10 nanohenrys and is comprised of at least ten coils on each side of the body 13.

The use of a parallel resonant radio frequency circuit as presented by the aforementioned Peter Chenausky et al patents and detailed hereinabove allow the construction of long phase locked ridge waveguide gas lasers operating at high frequencies which can be driven with a very simple single port RF connector.

Figure 2:
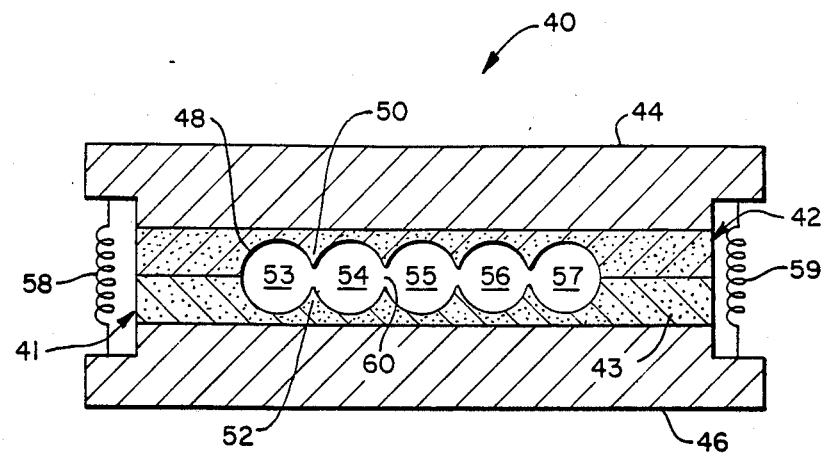
FIG. 2 is a sectioned illustration of a portion of the phase locked cusp-shaped ridge waveguide gas laser of FIG. 1.

FIG. 2 is a sectioned illustration of a portion 40 of the phase locked ridge waveguide gas laser of FIG. 1. Dielectric body 41, which consists of components 42 and 43, is bounded by upper RF electrode 44 and lower RF electrode 46. Within internal space 48 are ridges 50 and 52 which form respective resonators 53, 54, 55, 56, and 57. Each of the ridges 50 and 52 extends into the internal space 48 from a different one of the components 42 and 43. Each two ridges 50 and 52 which are aligned with one another in the vertical direction as considered in FIG. 2 constitute a respective pair. The internal space 48 and the ridges 50 and 52 formed in the body 41 are fabricated by techniques well known in the art. Also illustrated are discrete inductor coils 58 and 59 located between the upper and lower RF electrodes 44 and 46 on either side of the body 41. The inductors 58 and 59 comprise part of the distributed inductance parallel resonant circuit described hereinabove with respect to FIG. 1.

Although four ridges 50 and 52 creating five resonators 53 to 57 are shown, those skilled in the art will note that a greater or lesser number of ridges delineating a greater or lesser number of resonators may be selected. Such ridges 50 and 52 will then extend into the internal space 48 in respective pairs from the components 42 and 43. Moreover, although only a linear array of parallel resonators is illustrated, those skilled in the art will recognize that other geometrical resonator configurations such as cylindrical or opposed linear array of parallel resonators may be similarly chosen.

The height of the ridges 50 and 52 is selected to be less than half the height of the internal space 48 so that there is less than total physical separation between each adjacent two of the resonators 53 to 57. A gap 60 exists between the ridges 50 and 57. The gap 60 enables optical energy to leak between the adjacent ones of the resonators 53 to 52. The amount of optical coupling between adjacent resonators 53 to 57 is controlled by the gap dimension and width of the ridges 50 and 52 which form the separation between the respective adjacent resonators 53 to 57.

The gap 60 also allows the parallel electrical excitations in the resonators 53 to 57 to couple to one another, thereby obtaining uniform discharges and good initiation of all discharges within the individual resonators 53 to 57.

In order to increase the amount of coupling between channels, it would be desirable to fabricate as small a separation as possible and as large a gap 60 as possible. However, a countervailing consideration is that an increase in the gap will increase the likelihood of development of undesirable higher-order transverse modes or the power of such modes. This militates for as small a gap 60 as possible or feasible. Yet, the size of the gap 60 is limited by material and fabrication constraints.

In order to operate in the lowest order mode, the gap dimension must be a small fraction of the internal space depth. In the best mode embodiment, the internal space depth is between 0.1 and 0.5 cm. The resonator width is between 0.1 and 0.5 cm, and the gap 60 is ideally only 0.33 millimeter, as will be explained later.

For efficient operation of the laser, it is necessary that an RF excitation be created in each of the resonators 53 to 57. When the RF excitation is applied, the field strength between the electrodes 44 and 46 is much higher in the gap region than in the resonator region. Those skilled in the art will note that gas breakdown will first occur within the gap region. However, in the phase locked cusp-shaped ridge waveguide gas laser provided according to the present invention, the dimensions of the ridges 50 and 52 are selected to create a gap region discharge such that free electrons oscillating therein will make sufficient numbers of ionizing collisions with gas atoms within the resonators 53 to 57 to initiate and sustain a discharge in the resonators 53 to 57 adjacent to the ridges 50 and 52.

Figure 3:
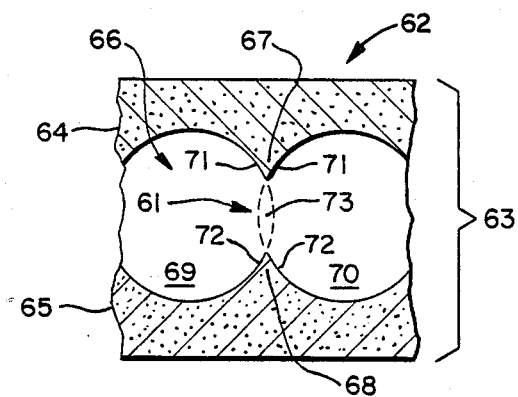
FIG. 3 is a sectioned illustration of a portion of an alternative embodiment of the phase locked ridge cusp-shaped waveguide of FIG. 1.

FIG. 3 is a sectioned illustration of a portion 62 of resonator geometry for the phase locked cusp-shaped ridge waveguide laser of FIG. 1 for use in explaining a cavity overlap concept employed by the present invention. Dielectric body 63 includes two components 64 and 65 and encloses an internal space 66 with ridges 67 and 68 fabricated therein. The ridges 67 and 68 extend longitudinally in the internal space 66 to form two cylindrical and substantially cross-sectionally circular resonators 69 and 70 having a cross section which approximately comprises a modified double concave geometry at each of the components 64 and 65. Each of the ridges 67 and 68 is delimited by two concave, especially cross-sectionally part-circular, surfaces 71 and 72 which meet or intersect at respective relatively sharp or rounded edges that bound a gap 61. The size of the gap 61 has been considerably exaggerated to facilitate the understanding of the following explanation. Imaginary continuations or extensions of the surfaces 71 and 72, which are shown in dashed lines and which follow the same course or have the same curvature as the surfaces 71 and 72 to constitute a smooth connection or transition therebetween, delimit an overlap region 73 which is shared by the two adjacent cavities 69 and 70. It will be appreciated that these surfaces 71 and 72 and their extensions constitute the outer boundaries of the gain volumes of the resonators 69 and 70, so that the overlap region 73 is shared by the gain volumes of the resonators 69 and 70. This sharing of a portion of the gain volumes provides for the desired phase locking. Every other aspect thereof is the same as in the phase locked cusp-shaped ridge waveguide gas laser described hereinbefore with respect to FIG. 1.

As is well known in the art, the resonator geometry of waveguide gas lasers must be selected to enable guided mode propagation of an optical signal within the guide. According to the present invention, the function of the ridges is to provide a sufficiently lossy boundary between resonators to enable guided mode propagation in the resonators, while providing for as much optical coupling by radiation leakage as possible. Therefore, it would be theoretically best to minimize the overall dimensions of the ridges themselves. Moreover, smaller ridge geometries allow for more compact laser designs and provide savings in material costs. Yet, as mentioned before, decreasing the dimensions of the ridges increases the sizes of the gaps therebetween, with attendant increase in the likelihood of development of undesirable higher-order transverse modes. To avoid this, it was attempted to keep the size of the gaps to a minimum while still maintaining sufficient phase locking.

All ridge portions must possess a certain minimum width or lose their structural integrity. Ceramic materials such as aluminum oxide or beryllium oxide break away when they are too thin. Thus, when it was attempted to make the overlap region 0.0254 millimeters wide, which would have resulted in the size of the gap 61 being about 0.33 millimeter under ideal conditions, the gap size actually obtained was 0.635 millimeters. Yet, excellent results in phase locking and suppression of higher-order transverse modes were obtained even with this larger size gap. Although conventional fabrication techniques can be used, ridges fabricated in ceramics require complex machinery and have high fabrication costs. Yet, such increased costs may be warranted to reduce the size of the gap 61 further.

A design which provides more compact geometry and ease of fabrication is a U-shaped waveguide as provided by commonly assigned application entitled U CHANNEL WAVEGUIDE LASER, U.S. Ser. No. 529,438, now U.S. Pat. No. 4,577,323, issued Mar. 18, 1986. A U-shaped resonator design mandates a modified double concave ridge cross-sectional geometry for a phase locked ridge waveguide gas laser. The double concave ridge geometry as applied in FIG. 3 is of superior strength as compared with such U-shaped resonator design because thicker walls at the base of the ridges 67 and 68 allow for more narrow ridges to be fabricated. Also, the modified double concave ridges 67 and 68 are more easily fabricated as they eliminate several machining steps needed to fabricate flat bottomed resonators. Furthermore, and possibly most importantly, the ridge shape proposed by the present invention provides for overlap of the gain regions of the adjacent laser resonator cavities, with attendant phase locking.

Figure 4A:
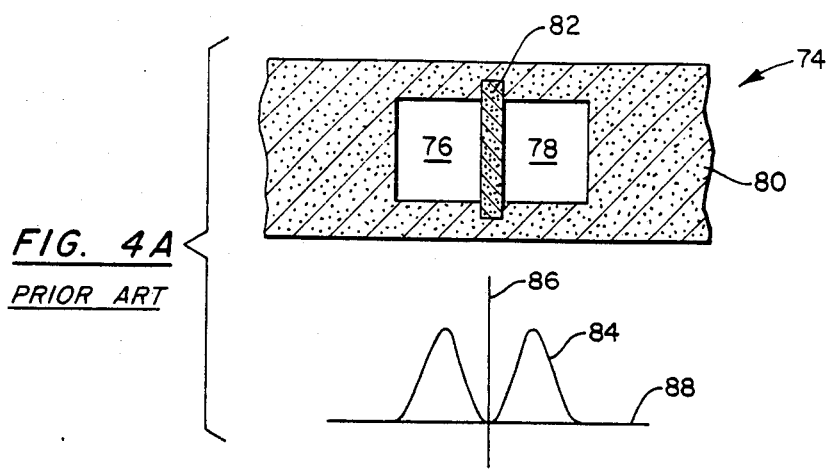
FIG. 4A is a sectioned illustration of a coupled waveguide gas laser of the prior art and a diagram of the intensity distribution of the optical field contained therein.

FIG. 4A illustrates a portion 74 of a coupled waveguide gas laser of the prior art comprising resonators 76 and 78 in ceramic body 80 separated by a dielectric medium 82 which is transparent to the laser radiation, and includes a diagram of the intensity distribution of the optical field therein. The diagram contains curve 84 of the optical intensity and axis 86 indicating intensity magnitude and axis 88 denoting position across the section. Those skilled in the art will note that of the two normal modes that are possible for weakly coupled resonators (symmetric and antisymmetric) only the symmetric mode is shown, as it is the only mode where laser intensities are in phase and at a maximum. Yet, the presence of the dielectric between resonators requires the optical field intensity to diminish to approximately zero therein which favors the selection of the antisymmetric normal mode. Moreover, the loss provided by the dielectric deprives the laser of optical power. In addition, it is difficult to obtain dielectrics with both good optical transmission and good heat conductivity.

Figure 4B:
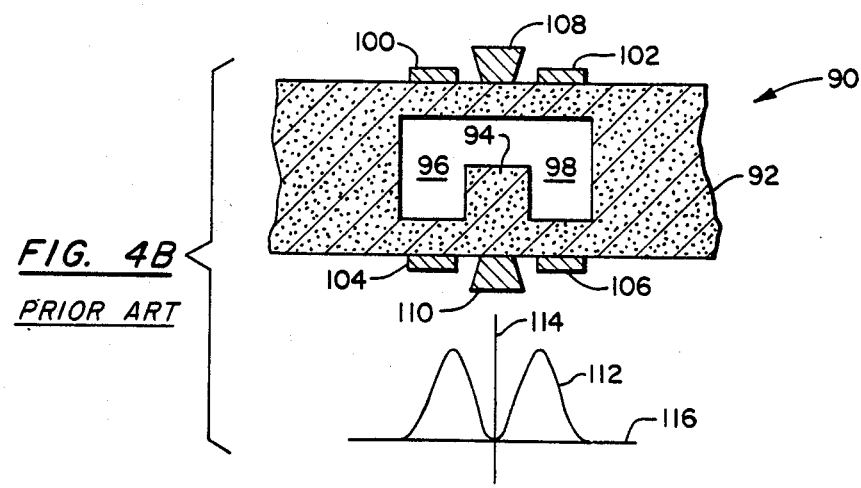
FIG. 4B is a sectioned illustration of a phase coupled ridge waveguide of the prior art and a diagram of the intensity distribution of the optical field contained therein.

FIG. 4B contains a sectioned illustration of a portion 90 of a phase locked ridge waveguide gas laser of the prior art and an intensity diagram of the optical field therein. The laser comprises ceramic body 92 with a ridge 94 fabricated therein forming resonators 96 and 98. Also included are a pair of upper RF electrodes 100, 102 and a pair of lower RF electrodes 104 and 106 as well as permanent magnets 108 and 110. The diagram has curve 112 of optical intensity. Axis 114 indicates the intensity magnitude and axis 116 denotes position across the section.

Removal of some of the dielectric from between the resonators eliminates a source of optical power loss. However, those skilled in the art will note that the lack of dielectric between the resonators would allow the lasing gas to break down in the gap region rather than the resonators. The permanent magnets prevent gas breakdown within the gap and confine the plasma to the resonators.

As in the case of a somewhat lossy dielectric, the optical field intensity in the region between resonators must also approach zero because of the requirement that the discharge be contained within the resonator housing.

Figure 4C:
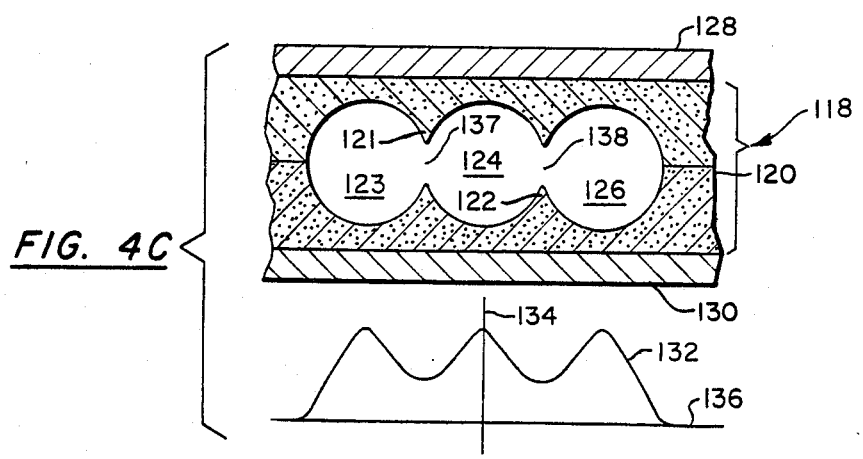
FIG. 4C is a sectioned illustration of a portion of a phase locked cusp-shaped ridge waveguide gas laser provided according to the present invention and a diagram of the intensity distribution of the optical field contained therein.

FIG. 4C is a sectioned illustration of a portion 118 of phase locked cusp-shaped ridge waveguide gas laser provided according to the present invention including body 120 having cusp-shaped ridges 121 and 122 fabricated therein forming resonators 123, 124 and 126. Also included are upper RF electrode 128, and lower RF electrode 130 and a diagram of the intensity of the optical field contained therein. The diagram, which illustrates the symmetric mode, contains curve 132 of the optical intensity, and axes 134 and 136 denote intensity magnitude and position across the laser section respectively.

Although only two of each of the ridges 121 and 122 are illustrated, those skilled in the art will recognize that the representations of the optical field for the double ridge/three resonator configuration can be extended to multiple ridge/resonator configurations. In the best mode embodiment the resonator physical parameters are selected to support only the symmetric mode of operation.

Examination of the intensity diagram of FIG. 4C reveals that the optical field intensity does not drop to zero in the gap region 137 or 138 between the resonators 123, 124 and 126. As described hereinabove, without dielectric material completely separating each resonator 123, 124 or 126, an excitation will be sustained in each of the resonators 123, 124 and 126 as well as in the gap 137 or 138 if the dimensional parameters of the ridges 121 and 122 are properly selected. Those skilled in the art will note that the presence of the optical discharge in the gap region provides unexpected benefits and is therefore desirable. Besides operating as a source of ionizing electrons for the resonators 123, 124 and 126, the lasing gas located in the gap regions is a source of optical power and contributes to the overall gain of the laser, especially since the gain regions of the adjacent lasers, such as 123 and 126, or 124 and 126, overlap each other at such gap regions. Moreover, the presence of the lasing gas mixture which acts as the gain medium inhibits the operation of the laser in the less desirable antisymmetric normal mode. The phase locked cusp-shaped ridge waveguide illustrated in FIG. 3 can also be used in the configuration illustrated in FIG. 4C.

Figure 5:
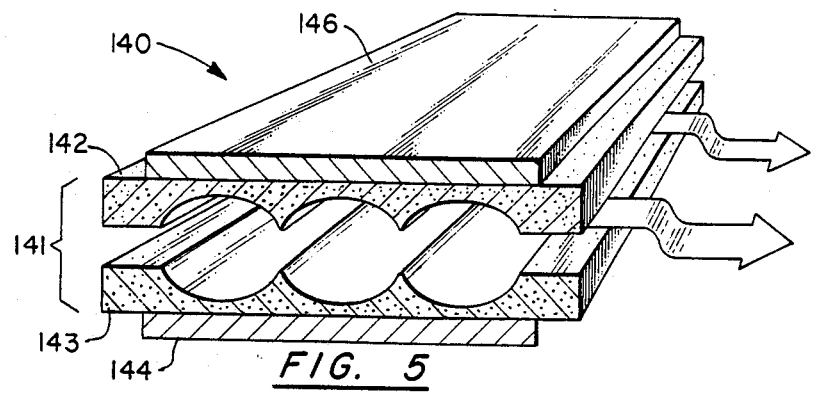
FIG. 5 is an illustration partially in section and partially in perspective of an alternative embodiment of a phase locked cusp-shaped ridge waveguide gas laser of FIG. 1.

FIG. 5 is an illustration partially in perspective and partially in section of a portion of an alternative embodiment 140 of a phase locked cusp-shaped ridge waveguide gas laser provided according to the present invention. Dielectric body 141 including components 141 and 143 is fabricated such that a large volume of flowing lasing gas can be provided to the internal space in a continuous fashion. The body 141 is bounded by a lower RF electrode 144 and an upper RF electrode 146. This configuration enhances the laser operational capabilities of the laser in very high continuous duty applications and also has the advantage of providing convective cooling by the flowing gas in addition to conductive cooling provided by the ceramic dielectric material forming the ridged waveguides. Moreover, discharge produced gas constituents which may be detrimental to the operation of the laser can be quickly removed. Housing, end covers, mirrors, and radio frequency excitation circuitry which comprise this alternative embodiment have not been illustrated and correspond to those elements described hereinbefore with respect to FIG. 1.

Figure 6:
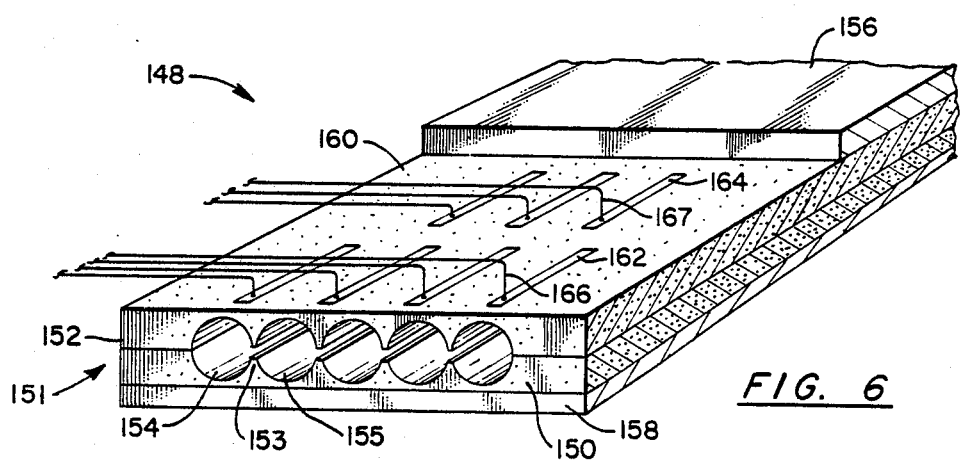
FIG. 6 is an illustration partially in section and partially in perspective of a phase controlled cusp-shaped ridge waveguide gas laser provided according to the present invention.

FIG. 6 is an illustration partially in section and partially in perspective of a portion of a phase controlled cusp-shaped ridge waveguide gas laser 148 provided according to the present invention. Internal space 150 is formed within ceramic body 151 consisting of components 152 and 160 and has a plurality of alternative ridges which define a plurality of resonators therebetween, of which ridge 153 separating resonators 154 and 155 is an example. Upper RF electrode 156 which extends less than the resonator length provides radio frequency excitation in conjunction with lower electrode 158. The dielectric cover component 160 of the body 151 is positioned on top of the bottom component 152, enclosing the internal space 150. Not shown in FIG. 6 are a metal housing and end covers which enclose the ceramic body 151 and RF electrodes 156 and 158 and are exactly analogous to corresponding metal housing and end covers described with respect to FIG. 1. Unless indicated herein, the materials and structures which comprise the laser described with respect to FIG. 6 are identical to corresponding materials and structures described with respect to FIG. 1.

In addition, for each of the plurality of resonators there exists discrete RF electrodes that are individually responsive to external signals provided thereto, of which electrodes 162 and 164 and corresponding lines 166 and 167 are examples. In the best mode embodiment the discrete RF electrodes comprise copper strips approximately 0.2 cm wide by 2 cm long and 20 μm in thickness deposited by conventional techniques on the ceramic cover 160. The additional radio frequency field provided by the supplemental electrodes causes a change in the plasma density of the gas contained in the resonators. Since the plasma density is related to the index of refraction, changing the local plasma density will produce a change in the effective optical path length of each of the resonators.

It is well known in the art that the phase and frequency of oscillation within the resonator is a function of the optical path length. Moreover, optically coupled resonators will phase lock only if all the resonators are within a narrow range of optical path lengths. Substantial variations in the optical path length of the resonators can be traced to several causes, especially environmental parameters such as thermal stresses for the phase controlled cusp-shaped ridge waveguide provided according to the present invention. In the past, it was assured that the optical path length difference between resonators should be less than 10% of the lasing wavelength in order to phase lock the guided mode optical signals therefrom. However, when tests were performed with the laser arrangement constructed in accordance with the present invention, it was determined that there existed robust phase locking in the antisymmetric mode. The degree of phase locking was measured by tilting an output coupler to induce a spreading of the individual cavity frequencies. The minimum beat observed was 40 MHz. If the individual cavities were within 40 MHz of each other, phase locking occurred.

The value of 40 MHz is four times the locking range of a previous U-channel, three guide array and two times the locking range of any array using the square- or U-channel guides. Blocking the center guide element of the array changed the far field pattern from an antisymmetric mode intensity pattern to a symmetric pattern with a central high intensity lobe. This verified that phase-locking of all three guides had been achieved. Power out of the device was 45 watts with 450 watts in.

The discharge intensity modulation provided by the supplemental RF electrodes is responsive to external signals and allows for optical path length compensation to be externally introduced. The phase adjustment provided by the variable optical path of each resonator will ensure phase locked operation of the laser.

Figure 7:
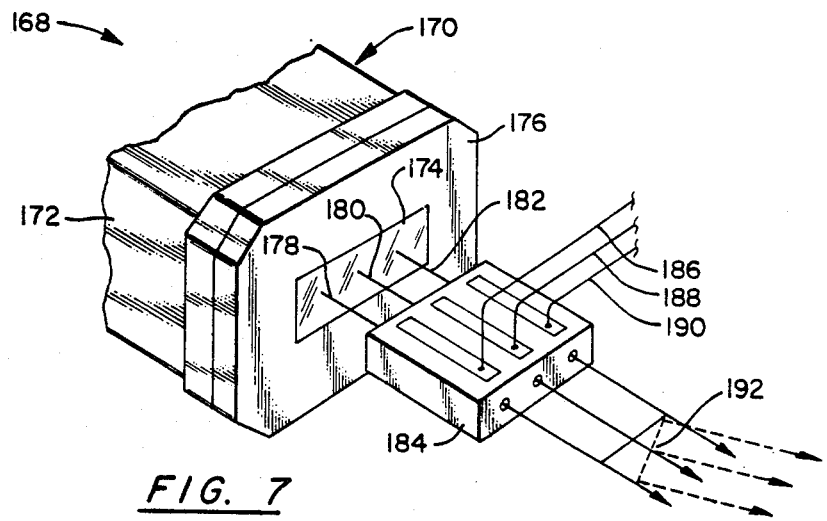
FIG. 7 is a perspective illustration of a cusp-shaped ridge waveguide optical phased array gas laser provided according to the present invention.

FIG. 7 is an illustration partially in section and partially in perspective of a laser arrangement embodying a cusp-shaped ridge waveguide optical phased array gas laser 168 responsive to an external signal that is provided according to the present invention. The cusp-shaped ridge waveguide optical phased array comprises phase locked cusp-shaped ridge waveguide gas laser 170 including metal housing 172 and mirror 174 mounted within end cover 176. Not illustrated in FIG. 6 is a complementary end port which encloses a ceramic body having longitudinal ridges and RF electrodes that are exactly analogous to corresponding components of a phase locked ridge waveguide gas laser described with respect to FIG. 1.

The output signals of the phase locked cusp-shaped ridge waveguide gas laser comprise guided mode optical signals 178, 180 and 182, all having the same phase. These signals are input into an extracavity phase modulator 184 which comprises a parallel array of cadmium telluride or equivalent conventional phase modulators, each of which receive a guided mode optical signal.

The phase modulators are responsive to external signals provided on lines 186, 188 and 190 by a control signal processor not shown and not part of the present invention. Due to the identical phase of the input guided mode optical signals, a slight perturbation to the optical path length thereof by the phase modulators will result in a tilting or change in direction of the phase front of the phase modulator output signal 192.

Figure 8:
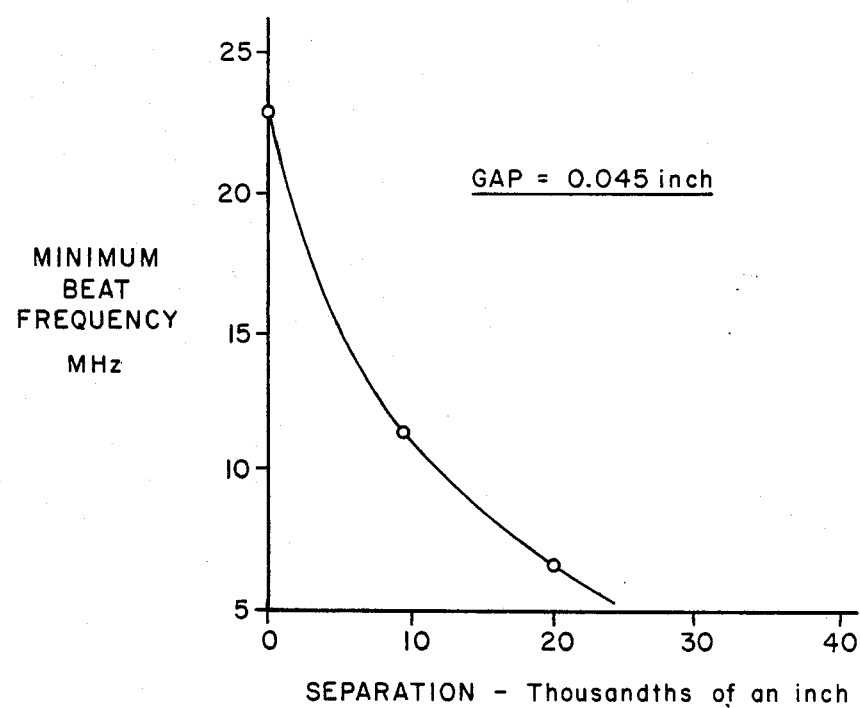
FIG. 8 is a graphic representation of the dependence of the degree of coupling on the guide separation.

As indicated in FIG. 8 of the description, the degree of coupling goes up steeply as the separation between the guides approaches zero. The cusp-shaped configuration of the ridges of the present invention takes advantage of this phenomenon by reducing the guide separation to such an extent that there is actually an overlap between the gain regions of the adjacent resonator cavities.

Similarly, although the invention has been shown and described with respect to a best mode embodiment thereof, it should be understood by those skilled in the art that various other changes, omissions and additions thereto may be made therein, without departing from the spirit and scope of the invention.

We claim:

1. A phase-locked ridge waveguide laser, comprising:
   a body circumferentially bounding an internal space extending along a central plane and having length and width dimensions parallel to said central plane and a height dimension normal to said central plane;
   a gaseous lasing medium contained in said internal space;
   excitation means disposed on said body for exciting said gaseous medium at radio frequency with attendant light emission from said gaseous medium;
   light-reflecting means so positioned relative to said body as to provide lasing of said light emission; and
   partitioning means for partitioning said internal space into a plurality of cylindrical laser resonator cavities each sustaining a guided mode of the lasing light emission, each of said cavities extending along said length dimension and being spaced from an adjacent cavity by a distance in the direction of said width dimension, said partitioning means including a plurality of cusp-shaped ridges extending into said internal space along said height dimension in respective aligned pairs and at least one of said ridges of each pair terminating short of said central plane to provide with the respective other ridge of the pair a gap which connects two adjacent ones of said laser resonator cavities for phase-locking said guided modes in such cavities.

2. The gas laser as defined in claim 1, wherein each of said ridges is delimited by two concave surfaces terminating at the respective gap.

3. The gas laser as defined in claim 2, wherein said concave surfaces delimiting at least one of said ridges of each pair form an edge at the respective gap.

4. The gas laser as defined in claim 3, wherein said concave surfaces delimiting the other of said ridges of each pair also form an edge at the respective gap.

5. The gas laser as defined in claim 4, wherein said distance is such that said adjacent resonator cavities bounded by the respective corresponding concave surfaces delimiting the respective ridge pair and by curved imaginary surfaces constituting smooth continuations of and connections between such corresponding curved surfaces overlap each other to a small extent at the respective gap.

6. The gas laser as defined in claim 5, wherein said extent by which said adjacent resonator cavities overlap is substantially between 0.01 and 0.04 millimeters.

7. The gas laser as defined in claim 1, wherein each of said resonator cavities is substantially circular in cross section.

* * * * *